Figure 1:
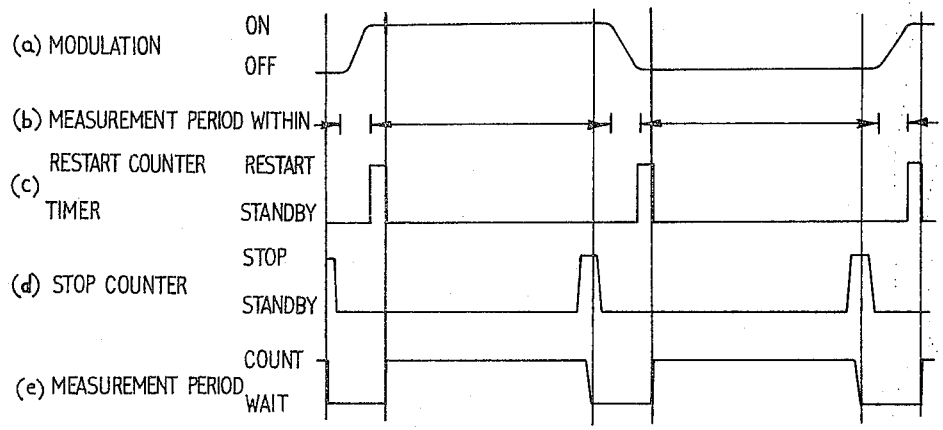

United States Patent [19]
Smythe

[11] 3,897,155
[45] July 29, 1975

[54] ATOMIC FLUORESCENCE SPECTROMETER

[75] Inventor: Lloyd Earle Smythe, Paddington, Australia

[73] Assignee: Unisearch Limited, Kensington, Australia

[22] Filed: Aug. 1, 1973

[21] Appl. No.: 384,723

[30] Foreign Application Priority Data
Aug. 4, 1972 Australia.............................. 9975/72

[52] U.S. Cl. ...................... 356/85; 356/87; 356/95; 356/97
[51] Int. Cl. .............................................. G01j 3/38
[58] Field of Search ......................... 356/88, 93–98, 356/85–87

[56] References Cited
UNITED STATES PATENTS
3,565,567  2/1971  Rains ..................................... 356/87
3,669,544  6/1972  Heller .................................... 356/85

OTHER PUBLICATIONS
Cordos et al., Analytical Chemistry Vol. 44, No. 14, December 1972, pages 2277–2282.

Primary Examiner—Ronald J. Stern
Assistant Examiner—F. L. Evans

[57] ABSTRACT

An improved atomic fluorescence spectrometer in which good correlation between output signal and concentration of sample is achieved by providing a dual channel biomodal detection system for the detection of modulated signals. This detection system provides means to allow for scattered light intensity as well as non-fluorescent emitted light. An improved method of detection of square or approximately square modulated signals allows information to be derived from the signals during up to 80 percent of elapsed time. Attachment of memory means with arithmetic capability allows automatic processing of output data.

6 Claims, 2 Drawing Figures

ATOMIC FLUORESCENCE SPECTROMETER

The present invention relates to improvements in atomic fluorescence spectrometers.

A well known method of analyzing small concentrations of a wide range of elements, commonly called atomic fluorescence spectrometry, involves an analysis of the intensity of fluorescence of an element, as excited by a sample light beam from a suitable lamp, in a flame into which a solution of the material to be analyzed is introduced in the form of a fine spray.

An atomic fluorescence spectrometer of the kind set forth in this specification basically refers to an instrument in which a sample beam of uv/visible radiation from a light source is directed by an optical system onto a sample of atomic vapour and the resulting fluorescence in a direction at an angle to the incident beam is gathered by another optical system and directed to a light detecting and measuring system. Methods of measuring intensity include monochromator, filter or solar-blind photodetector systems coupled with an amplifier, voltmeter digital or chart signal recording means. A system that produces good resolution is the monochromator photodetector system. Methods of producing atomic vapours are well known and include various flame systems, or non-flame atomization systems, such as graphite cup cells or thermal heating.

A typical well known instrument for chemical analysis using atomic fluorescence spectrometry has the following mode of operation. The material to be analyzed is dissolved in a solvent, normally water, which is aspirated into the flow path of gases to the flame, in a fine spray. On passing into the flame an atomic vapour forms. A sample beam of uv/visible radiation, the spectrum of which contains atomic spectral lines characteristic of the element the concentration of which is to be determined, is beamed onto the flame and the emitted light from the flame at an angle, normally a right angle, to this beam is observed and measured in intensity. Such an instrument may be called a single channel unimodal atomic fluorescence spectrometer.

The typical instrument described above is characterised by a single optical channel which, by means of an appropriate filter or monochromator, in conjunction with a photomultiplier, gives rise to an analogue signal. This signal strength is a function of the flame cell concentration of the given element and is measured by means of a chart recorder or a deflection meter.

Such instruments, however, have found only limited use in chemical analysis because of poor correlation between the output signal and the concentration in the sample of the element under analysis. This is due primarily to three factors:

1. The electronic noise associated with all types of light measuring devices.
2. The random variations, both in time and in position in the flame, in the atomic concentrations in the flame cell.
3. The presence of non fluorescence components in the overall output light from the body of the flame. The non-fluorescence components include (a) emission from atoms and molecules of the material under analysis which are excited by thermal means; (b) background that is emission of light from atoms, molecules and radicals formed from the flame gases and chemiluminescence of materials in the flame; (c) rayleigh scattering of the incident light from the lamp by particles in the flame body including vapourised and vapourising droplets of the solution of the material.

A known modification of the single channel, unimodal atomic fluorescence spectrometer described above utilises modulation of the beam of input light, at a convenient frequency. There are then two modes of operation, with light on and with light off, and the instrument may be called a single channel, bimodal atomic fluorescence spectrometer. The purpose of this modification is to more effectively compensate for the thermal emission from the atoms of the element under analysis and for the background emission of the flame, and to effectively reduce the variation in this background due to the instability of the flame.

In a practical form, the modulation of the light source can be achieved by means of a mechanical chopper placed between the source and the flame, or by pulsating the light source.

The modulation serves to impart to the source light a particular wave form and since fluorescent and scattering signals are directly dependent on the intensity of the source light, they too show the same modulation.

The intensity of the emitted light is then detected using a photomultiplier amplifier system which detects only the modulated components of the emitted light, i.e., the fluorescence and the scattering, thereby eliminating the non-modulated components. This method does not eliminate the problem of scattered light.

The present invention provides a method for estimating the intensity of scattered light and thereby giving an accurate measurement of the fluorescence alone.

According to the present invention the scattered light problem as defined above can be overcome by modifying an atomic fluorescent spectrometer of the kind set forth having means for modulating the sample light beam, by the provision of an improvement comprising incorporation of a double channel light detection and measurement system for detection and measurement of emitted and scattered light, each channel using the same atomic vapour containing an element to be analyzed as source of scattered and emitted light, means being included in each channel for detection and measurement of modulated signals derived from said modulated light beam, means being provided in one channel, the fluorescent channel, to detect and measure light at a wavelength at which the element fluoresces and means being provided in the other channel, the non-fluorescent channel, to detect and measure light at a wavelength at which the sample light has a strong flux but at which the element does not fluoresces, the fluorescent channel providing a measure of the fluorescence plus scattered light intensity and the non-fluorescent channel providing a measure of the scattered light.

Such a modified atomic fluorescence spectrometer could be called a Double Channel Bimodal Atomic Fluorescence Spectrometer.

To understand how an atomic fluorescence spectrometer with this configuration can yield an accurate measurement of the fluorescence signal consider the various types of radiant energy received by the detectors abbriviated as:

F     fluorescence
S     scattering
E     emission
B     background

Subscripts 1 and 2 indicate respectively the fluorescent and non-fluorescent channel.

Of the components in the emitted light, fluorescence and scattering are both dependent on the intensity of illuminating light (I) and fluorescence and emission are both dependent on the concentration (C) of the element concerned. If K represents a constant, the components are:

| | |
|---|---|
| fluorescence | $F_1 = K_{F1} \cdot I_1 \cdot C$ |
| scattering | $S_1 = K_{S1} \cdot I_1$ |
| | $S_2 = K_{S2} \cdot I_2$ |
| emission | $E_1 = K_{E1} \cdot C$ |
| background | $B_1 = K_{B1}$ |
| | $B_2 = K_{B2}$ |

As the signal is modulated, background and emission are so that the signals in the two channels are:

fluorescent channel $F_1 + S_1 = K_{F1} I_1 C + K_{S1} I$ non-fluorescent channel $S_2 = K_{S2} I_2$ The intensities of scattering at different wavelengths are proportional to the inverse fourth power of the wavelengths; this gives a ratio between $S_1$ and $S_2$ which is a constant at any one pair of given wavelength settings provided that $I_1/I_2$ is constant. The scattering signal $S_1$ may thereby be eliminated from the signal of $F_1 + S_1$.

In order that accurate statistical methods might be used on the signals from the two channels, and thus the reliability of the signal-concentration correlation be improved, it is preferred that each of the two channels terminates in a digital output system. In a practical form this can be accomplished by directing the output or the amplified output from the photosensitive detector to a voltage to frequency converter coupled to a digital counting device. Such a device is for instance a counter timer. Counter timers are simply digital counting devices that can integrate for certain set integration times. The voltage to frequency converter acts as a highly accurate analogue to digital transducer which produces a pulse train, the rate of pulses being directly proportional to the voltage input. Pulses may be counted over time periods specified by the timing device. The counts of pulses in each such period, may be recorded by printed or punched output, transferred to a digital memory store, or used as they are produced. The counts of a number of periods of similar parity may be averaged. The use of such a system serves to eliminate reading errors as well as to ensure a normal distribution of repetitive read out values.

Any other method suited to the purpose of accurately recording a measure of the intensity of light entering the photosensitive transducer, such as a digital or analogue volt meter, deflection meter, chart recorder, etc. may, of course, be used.

If a two channel system without modulated detection is used then it is not possible to determine an accurate estimate of $S_2$ and $S_1$.

The light modulation method of achieving signal reduction above is commonly by means of modulation at high speed (at typical speed of 285 hertz) and uses lock-in detection devices such as a lock-in amplifier to determine the amplitude of the resultant a.c. signal. The emission from the flame which effects the resultant signal is that which occurs during the decreases and increases of light intensity between light-on and light-off periods, (which may be for instance as little as 20 percent of the time of observation). Thus the considerable times during which the flame is fully illuminated or wholly in darkness give no information which can be used.

The output voltages from the lock-in detection devices give a measure of the differences between high and low intensities at the times of change of parity of the modulation.

This method, though adequate, has two shortcomings.

1. low sampling time in that perhaps 80% of the time the flame is observed no information is deduced for output;
2. The distribution of the differences, which are differential values of the light intensity, is unknown.

In a preferred embodiment of the invention an alternative method of modulation that allows a greater observation time and continuous measurement is used. The means for modulating the sample light beam imparts a square or approximately square waveform to the sample beam and the measuring means in each channel measure the square or approximately square modulated signal from the sample continuously when the parity of the modulation is not changing.

According to this method as applied in an embodiment where a digital output is used the modulation of a beam of light is effected at a frequency less than or equal to the integration time of an available digital counting device. This frequency value is selected to give the digital counting device a full or near full timed measurement on the portion of each half cycle when the parity is not changing and if the integration time can be reduced the frequency of modulation of the input light can be increased.

In a preferred embodiment the modulation frequency is conveniently 4 hertz.

In a practical form, the modulation of the light source can be achieved by means of a mechanical chopper placed between the source and the flame, or by pulsating the light source.

As stated above the modulation is such that the input light is in the form of a square wave or closely approximating square wave form and since fluorescent and scattering signals are directly dependent on the intensity of the source light, they too show this square or almost square modulation. Background and thermally induced emission from the flame, however, is independent of the source light intensity so its value as estimated during the light off period may be used as compensation for its effect on the total signal during the light on period.

Figure 2:
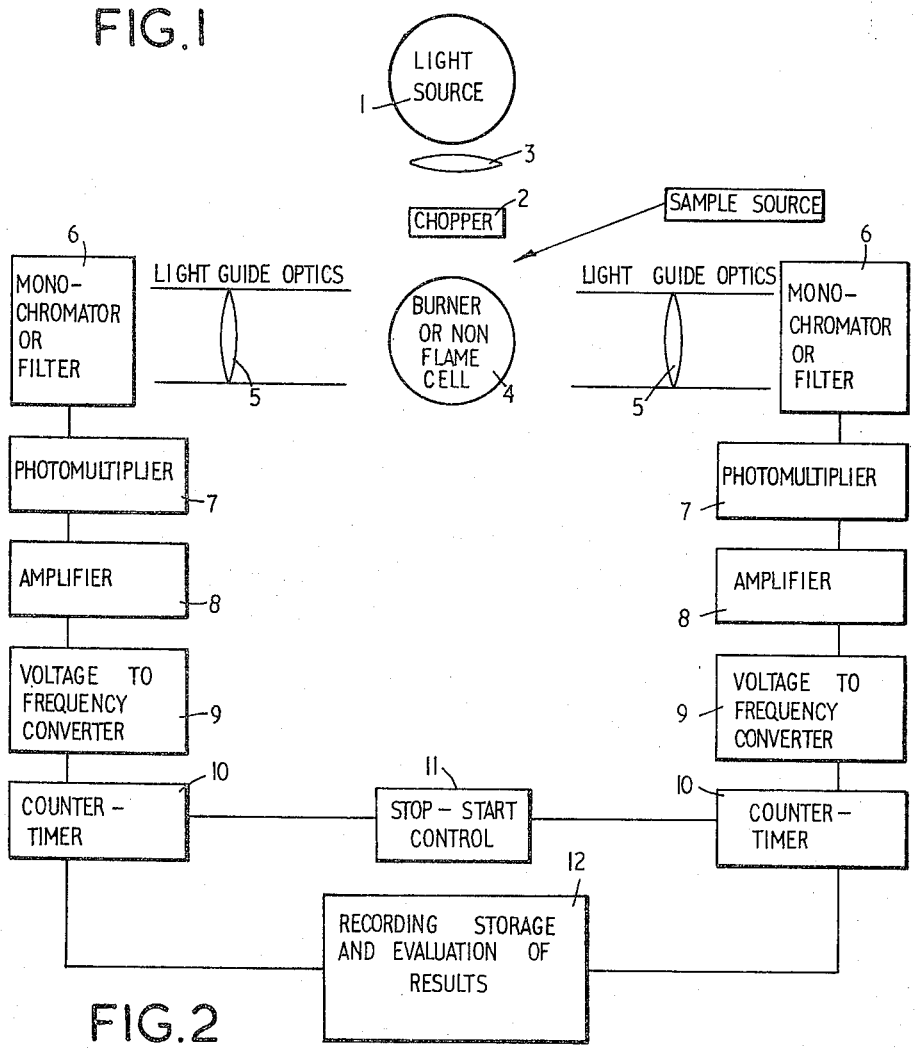

The invention will be more fully understood by reference to the accompanying drawings and the descriptive matter relating thereto, wherein:

FIG. 1 illustrates various wave forms according to the invention, showing the modulation and timing and measuring sequence employed; and FIG. 2 is a schematic diagram showing a preferred system according to this invention.

The operation of the preferred modulation method can be understood with reference to the table below, the terms used have been defined above

|  | Fluorescent channel | Non-fluorescent channel |
| --- | --- | --- |
| Quantity Measured during light on period A | $F_1+S_1+B_1+E_1$ | $S_2+B_2+E_2$ |
| Quantity Measured during light off period B | $B_1+E_1$ | $B_2+E_2$ |
| Difference (A-B) | $F_1+S_1$ | $S_2$ |

During the light-on period the fluorescent channel measures the sum of fluorescence scattering background and emission at the fluorescent wavelength (1) and the non-fluorescent channel and the sum of scattering background and emission at the non-fluorescent wavelength (2). With the light off only the respective background and emission is measured in each channel. By taking the effective difference between the light on and the light off measurement in each channel $F_1+S_1$ and $S_2$ are obtained and from this $F_1$ is determined as indicated above. The time of integration of the pulse rate over specified time periods must be wholly contained within successive light on periods or within successive light off periods.

FIG. 1 explains the modulation and timing and measuring sequence;
a. shows a square wave modulated signal and indicates the on and off period,
b. shows the period during which the parity of the signal is not changing in which measurement can take place. The maximum measuring period is the full on or full off period.
c. and d. show the signals that need to be generated to start and stop a counter integrating the signal,
e. shows the actual period during which counting takes place. This is a large proportion of the on period or off period.

Compared to the known lock-in detection techniques this method has the following advantages:
1. The time during which information is derived from the sample is greater, typically 80 percent of elapsed time. Observation is continuous and unbiased over this time rather than sampling for shorter intervals that are spaced more closely together.
2. The complexity of the synchronization signalling for the lock-in amplifier is eliminated and can be replaced by a simple and inexpensive circuit giving discrete pulses to signal commencement or termination of the count cycle.
3. Because the integration of pulses is an averaging process the distribution pulse counts is normal and more amenable to statistical handling, than the non-normal distribution arising from other detection devices.

With the preferred modulation technique the required synchronisation for the modulation and the times of start and finish of integration of the counter timer are provided by electronic instrumentation, which may be controlled by a computer in conjunction with synchronisation signals from the light path.

The information output in the form of digital values occurs at the end of each light on and light off period, for both of the two channels. These four signals, which are repeated each double period, may be recorded as specified above.

In a further preferred embodiment where automation and fast sample handling techniques are required it is necessary to process these signals as they occur. This can be achieved by the use of a digital memory with some arithmetic capacity and a readout capability. This can be either an internal computerlike unit integrated with the instrument or an external computer.

Through the use of an on line computer, objective statistical methods can be used with the speed necessary to be comparable with actual instrument measuring time. These techniques can also be used to greatly improve the precision and accuracy of the results.

By way of example only, a "mini-computer" may be used in many ways, some of which include
1. For instrumental control it can handle optimisation of flame height, gas flow pressures, monochromator wavelength before introduction of sample, indicate malfunctions of instrument components and prevent damage to instrument components during power failure halts.
2. During sample analysis it can indicate when readings should be continued, repeated, terminated or aborted. Sequential analysis techniques may be used to determine the number of sample readings required to yield chosen confidence limits on the results.
3. To choose standard solutions of similar concentration to a sample under analysis, the computer can control an automated sample changer so that samples, standard and blank solution introduction can be completely automatic.
4. For calculation of results, simultaneously with sampling, the computer should have the capability of calculating the flame background, scatter, emission and fluorescence signals, and examining their stability to determine nebulisation variations, light source variations and flame noise. The concentration of the element in the material can be estimated from these signals, and confidence limits for the concentration can be calculated.
5. From analysis of a number of samples of known concentration, the methods of linear regression or other techniques may be used to produce a calibration curve for fluorescence intensity against sample concentration.
6. Because of the method for separating the components of light emitted from the flame, it is possible to make meaningful comparisons between various flame and nebulisation techniques currently in use, and various sample preparation techniques, these examinations being independent of instrument variation. Thus optimisation of the instrument parameters is more easily possible.

A typical embodiment of the invention is described with reference to the schematic representations of FIG. 2. The embodiment consists of a light source 1 that produces a beam of radiation which contains an atomic spectral line characteristic of the element being estimated. This beam is modulated by a chopper 2 and directed by an optical system 3 onto an atomic vapour produced in a burner or non-flame cell 4. Light emitted from the sample is collected at two angles to the incident beam (here at right angles) and the collection light from each angle focussed by optical systems 5 onto the one of the two detection channels. Each detection channel consists of a monochromator or filter 6, photomultiplier 7, amplifier 8, voltage to frequency converter 9 and counter timer 10. One channel is set to detect the signal in a wavelength range that includes a wavelength at which the element fluoresces and the other to detect the signal at a wavelength range at which the sample light is intense but at which the element does not fluoresce. This system operates by chopping the light at approximately 4 hertz with observation of the signal during most of the off and most of the on period.

The switching of the counter-timer to start and stop timing at the appropriate time in the on-off cycle of the light modulation is accomplished by the well known method of synchronisation with the chopper via a stop-start control 11.

The outputs of the counter-timers are fed to a digital memory store 12 and are evaluated. The output from the counter-timers can be read and evaluated directly.

I claim:

1. An apparatus for atomic fluorescence spectrometry in which a true correlation between the output signal and the concentration of an element in a sample under analysis is obtained, substantially free of the effects of scattering, emission and background radiation, comprising:
   a. means for producing and modulating a sample light beam and directing the same to atomic vapor containing the element to be analyzed;
   b. means for producing an atomic vapor of an element to be analyzed and for receiving said sample light beam;
   c. two means, each for receiving and measuring light signals from said atomic vapor, one said means detecting and measuring light intensity at a wavelength at which the element under analysis flouresces, and the other said means detecting and measuring scattered light intensity at a wavelength at which said sample light beam has a strong flux but at which said element does not fluoresce;
   d. and means for subtracting from said detected and measured light representing fluorescent and scattered light, the detected and measured light representing scattered light.

2. An apparatus according to claim 1, wherein the means for modulating the sample light beam imparts a substantially square waveform to the sample beam, and each said measuring means is such that it measures the square modulated emitted and scattered light signal continuously when the level of the modulation is not changing.

3. An apparatus according to claim 1, wherein each said measuring means produces a digital output.

4. An apparatus according to claim 3, which further comprises means to achieve digital output in each said measuring means by directing the output of a photosensitive detector to a voltage to frequency converter which is coupled to digital counting means.

5. An apparatus according to claim 1, wherein means for recording the measurements in each said measuring means by printed output are included.

6. An apparatus according to claim 1, wherein memory means with arithmetic capacity and readout capability are included for processing and storing measurements from both said measuring means.

* * * * *